United States Patent [19]

Ishikawa et al.

[11] Patent Number: 4,611,216

[45] Date of Patent: Sep. 9, 1986

[54] CHARGED INK PARTICLES DETECTION HOUSING

[75] Inventors: Chuji Ishikawa, Kawasaki; Shigeyuki Araki, Komae, both of Japan

[73] Assignee: Ricoh Company, Ltd., Tokyo, Japan

[21] Appl. No.: 700,024

[22] Filed: Feb. 8, 1985

[30] Foreign Application Priority Data

| | | | |
|---|---|---|---|
| Feb. 22, 1984 | [JP] | Japan | 59-32054 |
| Feb. 22, 1984 | [JP] | Japan | 59-32053 |
| Feb. 22, 1984 | [JP] | Japan | 59-32057 |
| Feb. 22, 1984 | [JP] | Japan | 59-32056 |
| Feb. 22, 1984 | [JP] | Japan | 59-32055 |

[51] Int. Cl.$^4$ .............. G01D 15/18

[52] U.S. Cl. .............. 346/75; 346/140 R

[58] Field of Search .............. 346/75, 140 R

[56] References Cited

U.S. PATENT DOCUMENTS

| | | | |
|---|---|---|---|
| 3,596,275 | 7/1971 | Sweet | 346/1.1 |
| 4,430,658 | 2/1984 | Fukazawa et al. | 346/75 |
| 4,434,428 | 2/1984 | Hokine et al. | 346/75 |

FOREIGN PATENT DOCUMENTS 108167 12/1981 Japan .

*Primary Examiner*—E. A. Goldberg

*Assistant Examiner*—Gerald E. Preston

*Attorney, Agent, or Firm*—Mason, Fenwick & Lawrence

[57] ABSTRACT

A charge detecting electrode unit is disclosed which is coupled to a platen shaft of an ink jet printer so as to be rotatable relative thereto for detecting a deflected position of charged ink particles. It includes a housing having an internal space in which a charge detecting electrode is centrally located. The housing is formed with an opening which receives flying ink particles, in its front surface. An electrically conductive layer is formed on and continuously extends across the internal wall surfaces and the external surface of the housing around the opening, and an electrically conductive and water absorbing sheet is attached to the outer periphery of the housing and is in contact with the conductive layer located around the opening which is connected to a grounding wire. The housing also includes a compartment which houses a water absorbing pad and which is open to the exterior of the housing. The water absorbing sheet extends into the compartment, and the pad housed within the compartment is in contact with the sheet. The compartment is normally closed by a closure. An isolating plate is disposed in the opening to divide it into an upper and a lower area, thus preventing an ink which has found its way into the lower area from being dispersed into the upper area.

10 Claims, 6 Drawing Figures

CHARGED INK PARTICLES DETECTION HOUSING

FIELD OF THE INVENTION

The invention relates to an apparatus for a charge controlled ink jet recording system, and in particular, to an apparatus for detecting the amount of deflection of charged ink particles.

BACKGROUND OF THE INVENTION

A typical example of a charge controlled ink jet recording system is disclosed in U.S. Pat. No. 3,596,275 issued to Richard G. Sweet wherein a pressurized ink is supplied to an ink injection head which produces an oscillation of a given period in the pressure of the pressurized ink. An ink stream issuing from the nozzle of the head is separated into ink particles with a given period, at a location which is a given distance advanced from the nozzle. A charging electrode is located at the location where the ink stream is separated into particles. By applying a charging voltage to the electrode as the ink is converted into particles, the ink particles can be charged. The charged ink particle is then deflected in a deflecting electric field for impingement upon a record paper. Non-charged ink particles move straightforward to be trapped by a catcher to be returned to an ink vessel.

One of problems which are experienced in the art of ink jet recording relates to that of an offset in the deflection of ink particles or an offset in the position where a record is made by the ink, which may result from a member of factors including a fluctuation in the temperature or pressure of the ink, inaccuracies in the dimension of the ink injection nozzle, the presence of dirts deposited on the nozzle or the existence of solidified ink, among other factors. A variety of apparatus for detecting deflection is employed in order to detect such offset. A related Japanese Laid-Open Patent Application No. 108167/1983 assigned to the same assignee as the present invention discloses a deflection detecting apparatus which utilizes a detector unit having an opening in its front surface through which flying ink particles may pass and an electrode disposed within the unit for detecting the charged ink particles. In order to establish a print position of the charged ink particles on a platen which carries a record paper, the detector unit is supported by a position adjusting mechanism which includes a link arm, a coiled spring and an adjusting screw. Tightening the screw lowers the detector unit while loosening the screw causes the detector unit to be raised by the resilience of the coiled spring. This achieves a vertical adjustment of the location of a detecting electrode relative to the platen. The amount of deflection of ink particles is adjusted so that the charged ink particles pass by or impinge upon the edge of the detecting electrode. In this manner, the charged ink particles may be caused to impinge upon the platen (or the record paper carried thereby) at a given location, by controlling the elevation of the detector unit by means of the adjusting screw and controlling the magnitude of the charge so that the charged ink particles reach the edge of the charge detecting electrode of the detector unit.

The deflection detecting apparatus of the kind described presents a variety of problems including the requirement for the provision of an increased space volume for the installation of the apparatus, the need for a complex positioning mechanism for the detecting electrode of the unit, the occurrence of chattering or the necessity for a time and labor consuming adjusting operation. By way of example, in the aforesaid Japanese Laid-Open Patent Application, the apparatus utilizes a bulky mechanism to support the detector unit, and thus requires an increased space volume for its installation.

A deflection detecting apparatus of the kind described is connected to a charge detector circuit which may comprise an integrator and a comparator, for example, and which is operable to detect the occurrence or not of impingement of the charged ink particles onto the detecting electrode in a manner such that the occurrence of impingement or the charge is detected if an integrated voltage is equal to or greater than 2 volts and the absence of impingement is determined or the detection of the charge is denied for an integrated voltage less than 2 volts. However, it will be appreciated that there is a suspension of an ink mist within the volume in which the detecting electrode is received, the mist wetting the internal wall surface or a support associated with the electrode. The ink which is deposited in this manner may cause a leak path from the detecting electrode or a short-circuit to the ground, resulting in a detection error or the inability of detection.

By way of example, in the deflection detecting apparatus disclosed in the aforesaid Japanese Laid-Open Patent Application, a diamond-shaped detecting electrode is centrally supported by a horizontally extending conductor pin. The adjustment of the deflection is terminated when a proper amount of deflection of the charged ink particles is obtained, which occurs when the charged ink particles which have been impinging upon the upper edge of the electrode are deflected to pass slightly over the upper edge or conversely when the charged ink particles which have been passing over the upper edge are deflected to impinge upon such edge. It will be appreciated that during the adjusting process, the charged ink particles impinge upon the upper edge of the electrode, and this allows the ink to flow therealong to the conductor pin and thence to an external lead connection. In the course of such flow, it may contact with the ink wetted wall surface to cause a leak path from the electrode or a short-circuit to the ground.

In the cited Application, the formation of such leak path or the short-circuit to the ground is prevented by interposing a partition between a portion of the conductor pin which is connected to an external lead and the detecting electrode, and passing the conductor pin through an opening formed in the partition to avoid a contact between the conductor pin and the partition. The provision of the partition stands in the way to a flow of an ink mist or ink spray to a portion of the conductor pin which is connected to an external lead, thus reducing a wetting of the entire pin by the ink. However, during a prolonged period of use, an accumulation of ink on the electrode is transferred to the conductor pin, which gradually increases its volume to move along the conductor pin into contact with the partition and merges with the ink which is wetting the partition, again causing a leak path from the electrode or a short-circuit to the ground. In particular, when a manner of operation is used in which an ink which has travelled to and is contained in the detecting unit in the process of detecting and adjusting the amount of deflection is discarded and a quantity of ink which remains in an ink circulating system is injected into the opening of the detector unit for a given time interval either before or after the detection or adjustment of the deflection so that stale ink is consumed rapidly in order to permit the viscosity of the ink to be controlled, an ink spray or mist which is generated upon impingement of the ink particles on the internal wall of the unit produces a wetting of the electrode and the conductor pin, leading to a premature occurrence of the leak path or the short-circuit to the ground.

In the absence of such leak path or short-circuit, noise voltages may be induced on the detecting electrode if the charged ink particles do not impinge upon the electrode and the charge detector circuit may produce an integrated voltage on the order of 1 volt. It will thus be seen that the integrated voltage will be low in the presence of a leak path while an increased magnitude of noise voltages will be present in the absence of such leak path. Accordingly, in the design of the charge detector circuit, there is a reduced allowance of the detected voltage which may be utilized to discriminate the presence and absence of charge against each other, resulting in a high probability that a detector error may occur.

In addition, the impingement of the charged ink particles upon the detecting electrode produces an ink spray or mist, marring the unit around the opening with the ink. If the amount of such ink deposition increases, it may flow down the external surface of the wall adjacent to the opening, thus marring the printer. This results in the need to clean around the deflection detecting apparatus frequently. It will be appreciated that the elimination of an ink marring of the printer represents a time and labor consuming operation.

SUMMARY OF THE INVENTION

It is a first object of the invention to provide a deflection detecting apparatus which does not require an unduly increased space volume within an ink jet printer for its installation, which substantially suppresses a chattering of a detector unit while employing a support mechanism of a simple construction therefor, and which dispenses with a troublesome adjusting operation.

It is a second object of the invention to provide a deflection detecting apparatus which enables the allowance for the design parameters of a charge detector circuit to be increased while highly suppressing a detection error. It is a third object to provide a deflection detecting apparatus which prevents an ink dripping from an external surface thereof and which facilitates a cleaning operation.

It is a fourth object of the invention to prevent an ink marring of various parts of a deflection detecting apparatus where such apparatus is employed as an receptor for an ink that is injected to be discarded for purpose of controlling the viscosity of an ink. A fifth object is to enable the allowance in the design of a charge detector circuit to be increased to thereby suppress the occurrence of a detection error where a deflection detecting apparatus is also utilized as an receptor for an ink that is injected to be discarded.

Above objects are achieved in accordance with the invention by providing an apparatus for detecting deflection of charged ink particles comprising a charged ink particle detector unit including an opening formed in its front surface for passing flying ink particles therethrough, an electrode disposed therein for detecting charged ink particles, a screw abutment located on the rear side for engagement with an adjusting screw, and a bore defined between the opening and the screw abutment for allowing a shaft member to pass therethrough; a shaft member extending through the bore; spring means for urging the detector unit to rotate in one direction about the shaft member, and an adjusting screw member disposed for engagement with the screw abutment and a stationary piece for preventing the detector unit from being rotated under the resiliecne of the spring means, tightening and loosening of the screw member causing the detector unit to rotate about the shaft member.

With the arrangement of the invention, the adjusting screw may be engaged with the detector unit at the rear thereof either from upper or lower side and may be turned to control the angle of rotation of the unit. Rotation of the detector unit results in a change in the elevation of the detecting electrode, thus permitting the elevation of the electrode to be established by the use of the adjusting screw.

The deflection detecting apparatus as described above does not require an unduly increased space volume within an ink jet printer for its installation. In addition, a support mechanism of a simple construction may be used to support the detector unit without causing any chattering while simplifying an adjusting operation.

In a preferred embodiment of the invention, the shaft member comprises a support member through which a platen shaft extends, or a support sleeve which supports the platen shaft with a bearing interposed therebetween; and the detector unit comprises a threaded hole which is formed through the upper surface of the unit to extend to the bore, and a locking screw member which is threadably engaged with the threaded hole and is clamped against the support member.

With this embodiment, an operator may loosen the locking screw initially, and may turn the adjusting screw to control the angle of rotation of the detector unit or the elevation of the detecting electrode. After such adjustment, the locking screw may be tightened to secure the detector unit to the support member associated with the platen shaft. Subsequently, any chattering of the mechanism or loosening of the adjusting screw does not result in rotating the detector unit, thus assuring that the detector unit is locked in position after the adjustment. Nevertheless, the adjusting operation is greatly simplified.

The deflection detecting apparatus is juxtaposed with one side of the platen. Because the platen shaft extends through the apparatus which is juxtaposed with the platen, it follows that the space occupied by the apparatus is reduced without producing any undue arrangement or waste in the arrangement of the mechanism of the ink jet printer or the internal space.

In the preferred embodiment, the detector unit includes a charge detecting electrode which is suspended from an electrode support in a manner such that an upper edge of the electrode where an impingement of ink particles occurs is located below an end of the support which carries the electrode. As a consequence, any deposition of ink on the electrode accumulates at a location which is below the electrode support, and when it grows to a droplet of a greater size, it drips down. Accordingly, it is less likely that the ink is transferred to the electrode support. In this manner, the probability that the ink may find its way along the electrode support is diminished, as is the probability of inducing a leak path or a short-circuit.

In the preferred embodiment of the invention, the electrode support is coated with an insulating material for a portion thereof where it is electrically connected. A partition is located between a portion of the electrode support which is connected to an external lead and the electrode. The internal wall surface which surrounds and defines a space in which the electrode is received is electrically conductive and is connected to a ground lead. A body of the detector unit has its external surface located around the opening, into which the charged ink particles pass, covered with an electrically conductive and water absorbing sheet which in turn extends into a space in which a water absorbing member is housed, the electrically conductive and water absorbing sheet being also connected to a ground lead. The detector unit is provided with a removable closure which closes the space in which the water absorbing member is housed.

With this construction, the possibility that a leak path may be formed by an ink which finds its way along the electrode support is further reduced, and an ink mist distributed around the opening is deposited on and absorbed by the water absorbing sheet. When the sheet has absorbed an increased amount of ink, the latter flows down the sheet into the space which houses the water absorbing member, whereby it is absorbed by the member. This avoids the occurrence of any dripping of the ink from the detector unit, thus eliminating a marring of the printer. When the water absorbing member has absorbed an increased amount of ink, it may be changed. Such change is facilitated since the space in which the member is housed is closed with a removable closure. The water absorbing sheet shields the interior of the detector unit, further contributing to reducing the occurrence of a detection error.

As mentioned previously, the electrically conductive internal wall surface of the space in which the charge detecting electrode is received and which is connected to the ground lead enables the surrounding wall to function as an electrostatic shield, thus shielding the detecting electrode from an extraneous noise source. As a consequence, the charge detector circuit connected to the detecting electrode does not produce any substantial integrated voltage when there is no impingement of the charged ink particles upon the detecting electrode.

Also, in the preferred embodiment, the opening into which the ink particles pass is divided into an upper and a lower area by an isolating plate which prevents ink particles passing into the lower area from being splattered into the upper area. This arrangement is advantageous where a quantity of ink to be discarded is injected in order to control the viscosity of the ink by accelerating the consumption of stale ink. Specifically, by directing the injected ink toward the lower area which is defined by the isolating plate, the likelihood that the injected ink to be discarded may mar the detecting electrode or the electrode support within the detector unit is reduced, lessening the possibility that a leak path from the detecting electrode or a short-circuit to the ground may be formed through the electrode support.

In the preferred embodiment, the isolating plate is disposed at an angle with respect to a line of incidence along which ink particles move into the lower area, and is also curved in configuration so as to guide the ink particles in a downward direction. On the other hand, the charge detecting electrode is suspended from the electrode support in a manner such that its upper edge where the ink particles impinge is located above the isolating plate and below an end of the electrode support which carries the electrode. This obviously prevents the electrode from being marred by a spray of injected ink to be discarded, and also causes any ink deposition on the electrode to be accumulated at a location below the electrode support. When the accumulation of the ink grows to a droplet of a greater size, it drips down, and thus is prevented from being transferred to the electrode support. In this manner, the flow of the ink along the electrode support is diminished, resulting in a corresponding reduction in the possibility that a leak path or a short-circuit may be formed.

Other objects and features of the invention will become apparent from the following description of a preferred embodiment thereof with reference to the attached drawings.

DESCRIPTION OF PREFERRED EMBODIMENT

Figure 1:
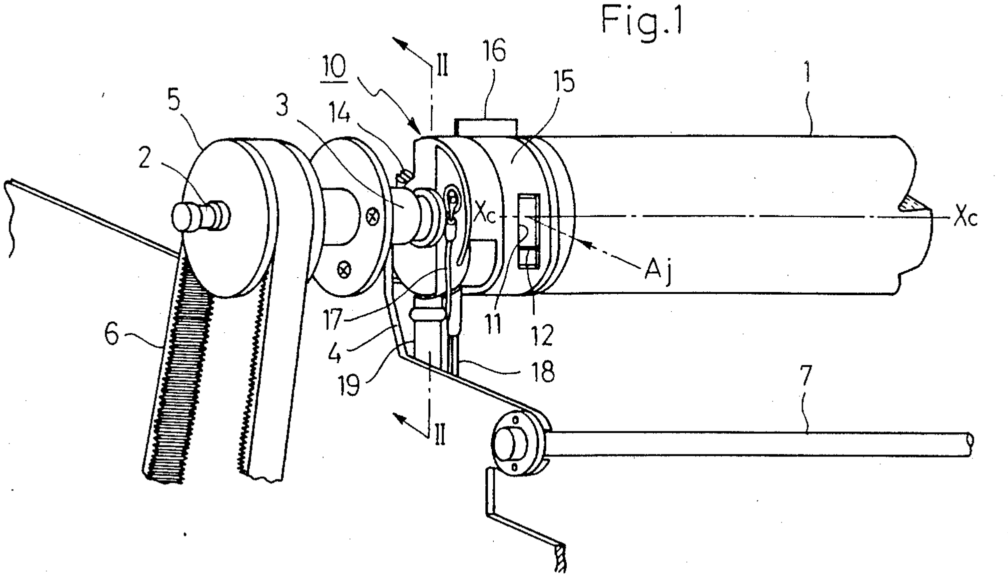
FIG. 1 is a perspective view, showing the appearance of a preferred embodiment of the invention.
Figure 2:
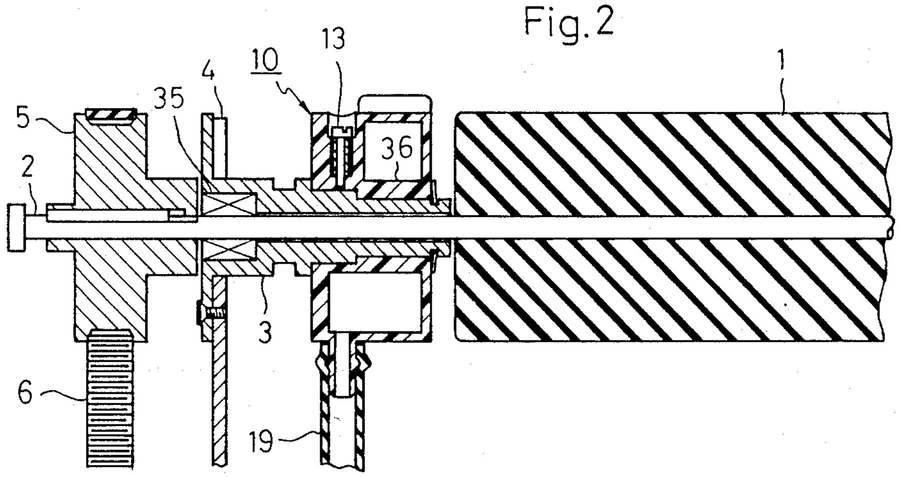
FIG. 2 is a longitudinal section taken along the line II—II shown in FIG. 1.

Referring to FIGS. 1 and 2, there is shown a printer including a sideplate 4 in which a platen shaft support sleeve 3, which internally houses a bearing 35, is fixedly mounted. A platen shaft 2 extends through the support sleeve 3. A platen 1 is integrally secured to the platen shaft 2 and carries a record paper. A pulley 5 is fixedly mounted on the left end of the platen shaft 2 which has extended through the support sleeve 3. A belt 6 extends around the pulley 5 and is adapted to be driven by a motor through a clutch and reduction gearing, not shown, for driving the platen 1 for rotation. The rotation of the platen 1 feeds a record paper, not shown.

Fixedly mounted on the sideplate 4 of the printer is a carriage guide bar 7 having a carriage, not shown, attached tehreto on which an ink jet record head, not shown, is mounted. In this manner, the carriage can be driven by a motor through an arrangement including a wire, a pulley, a clutch, a reduction gearing and the like so as to move to the left or right along the guide bar 7.

The direction in which an ink is injected or projected by the record head is indicated by an arrow Aj. Thus it will be seen that when a record is made by injecting an ink of a uniform charge while driving the carriage, a line segment extending along Xc—Xc is recorded.

It is to be noted that the platen shaft support sleeve 3 has a length which is greater than a usual length used, by an amount which is necessary to permit a detector unit 10 to be mounted thereon, it being understood that an increased length being necessary to pass through the detector unit 10. The detector unit 10 is rotatable relative to the support sleeve 3, but under the condition shown in FIG. 2, a locking screw 13 which is threadably engaged with the detector unit 10 is tightened against the support sleeve 3, whereby the rotatable unit cannot be rotated relative to the support sleeve.

Figure 3:
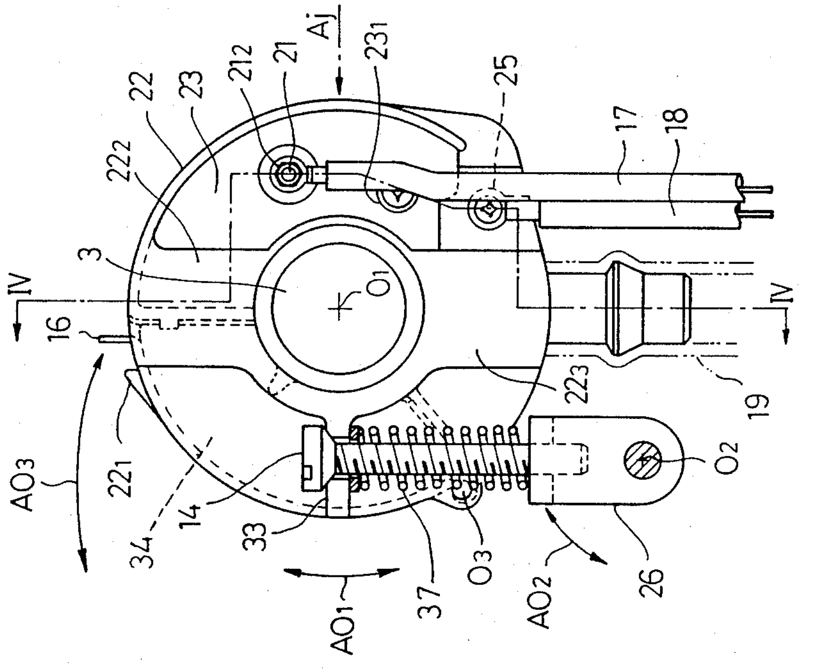
FIG. 3 is an enlarged side elevation of a deflection adjusting apparatus shown in FIGS. 1 and 2.

The deflection detecting unit 10 will now be more specifically described with reference to FIG. 3, which is a left-hand side elevation, FIG. 4 which is a cross section taken along the line IV—IV shown in FIG. 3, FIG. 5 which is a cross section taken along the line V—V shown in FIG. 4 and FIG. 6 which is a plan view.

The detector unit includes a body 22 which is substantially cylindrical in configuration and is substantially closed at its both ends. A partition 28 corresponding to a bottom wall divides the interior of the body into a space Hic in which a detecting electrode is disposed and a region Hos through which a lead is derived. An opening 11 is formed in the front wall of the body 22. A sleeve 36 which permits a shaft member to extend therethrough is integrally formed with a central portion of the partition 28. A sleeve 29 of a diameter which is less than that of the sleeve 36 is integrally formed with the partition 28 at a location which is offset from the center thereof. The partition 28 has an increased wall thickness on the side adjacent to the left end of the sleeve 36 or in the region Hos (see FIG. 4) and in the upper portion $22_2$ of the sleeve 36 (see FIG. 3), the thickened wall extending into the region Hos. A threaded bore extends through the thickened wall $22_2$ from the upper surface thereof to a bore defined inside the sleeve 36, and is threadably engaged by the locking screw 13. Adjacent to the left end of the sleeve 36 or the region Hos (see FIG. 4) and in the lower portion $22_3$ (see FIG. 3) of the sleeve 36, the partition 28 bulges into the region Hos to provide a communication between the detecting electrode space region Hic and an ink discard pipe 19 positioned within the region Hos.

A spring abutment 33 is formed to be integrally contiguous with the thickened wall $22_2$ and the lower portion $22_3$ of the sleeve 36 at the left end thereof (see FIG. 4), and is formed with a slit which is engaged by an adjusting screw 14, the slit being formed to permit the insertion or withdrawal of a shank portion of the screw 14. Specifically, the screw 14 extends through a coiled compression spring 37 (FIG. 3) and is threadably engaged with a stationary piece 26 which is in turn rotatably carried by a pin $O_2$ which is secured to the side-plate 4. By tightening the screw 14, the body 22 of the detector unit may be turned counter-clockwise or in a direction indicated by a both-ended arrow $AO_1$ shown in FIG. 3, and by loosening the screw 14, it may be turned clockwise or in a direction indicated by the arrow $AO_1$. When the screw is turned in this manner, the head of the screw 14 will swing laterally, as viewed in FIG. 3. To prevent any resulting chattering from occurring between the screw 14 and the abutment 33, the lower surface of the head of the screw 14 is shaped to be a part of a sphere while the top surface of the abutment 33 is machined to a spherical configuration having the same configuration as the lower surface of the head, thus conforming thereto.

Figure 4:
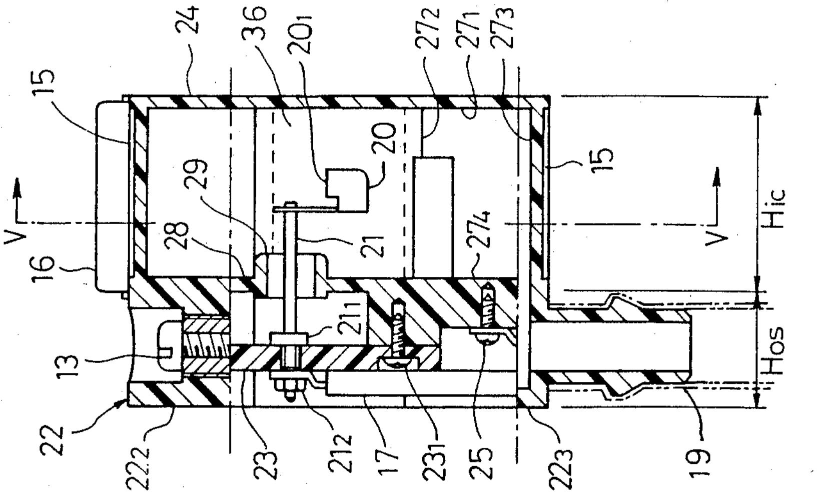
FIG. 4 is a cross section taken along the line IV—IV shown in FIG. 3.

A charged ink particle detecting electrode 20 is substantially L-shaped, as viewed in front elevation (FIG. 4), and is secured to the right end, as viewed in FIG. 4, of an electrode pin 21 in suspended form. The detecting electrode 20 is located opposite to a record head in a manner as illustrated in FIG. 4, and has an upper edge $20_1$ which is utilized to detect the deflection of the ink particles and which is positioned to be below the pin 21. Except for its right end and left-hand threaded end portion, the pin 21 is coated with an insulating paint. The left end of the pin 21 extends through the center of the sleeve 29 integrally formed with the partition 28 and is secured to an electrode support plate 23. Specifically, the left-hand threaded end portion (see FIG. 4) of the pin 21 extends through the electrode support plate 23, and a tap from a lead wire 17 is disposed around the projecting end portion which is then engaged and clamped by a nut to be secured to the electrode support plate 23. The support plate 23 is in turn fixedly connected to the partition 28 by a locking screw $23_1$. When the parts are secured in this manner, the pin 21 which is provided with an insulating coating extends through the sleeve 29 formed with the partition 28, without touching it. As shown, the detecting electrode 20 is suspended from the right end of the pin 21.

The right end opening (see FIG. 4) of the body 22 is closed by a closure plate 24. The internal surface $27_1$ of the closure plate 24, the surface of the sleeve 36, the internal surface $27_3$ of the body 22 which is disposed within the space Hic, the entire partition 28 except for its internal surface around the sleeve 29 and the internal surface of the latter, and the internal surface of the opening 11 as well as the external surface of the body 22 at the front thereof which is located outside the opening 11 are applied with an electrically conductive paint which extends continuously throughout the interior and the exterior and which serves as a shield film. The conductive paint also extends continuously from the external surface at the front of the body 22 to the left-hand side surface and to the external surface which is located below the electrode support plate 23. A grounding wire 18 is electrically connected to the conductive paint or shield film by means of a screw 25. The combination of the conductive paint and the grounding wire 18 provides a shielding effect over the internal surface of the space Hic except for a region surrounding the sleeve 29, and over the external surface surrounding the opening 11.

The space Hic within the body 22 is divided by a pair of axially extending end walls 31, 32 (FIG. 5) to define a sector-shaped space at the rear portion of the space Hic. An electrically conductive and water absorbing sheet 15 is wrapped around the external peripheral surface of the body 22 which surrounds the detecting electrode space, and has its one end engaged with a projection $30_1$ (FIG. 5) projecting externally from the end wall 31 and its other end engaged with another projection $30_2$ externally projecting from the other end wall 32. The water absorbing sheet 15 is formed with an opening which conforms to the configuration of the opening 11, thereby preventing the opening 11 from being blocked. The external surface of the body 22 which is disposed in contact with the water absorbing sheet 15 is applied with the conductive paint mentioned above. To assure the electrical interconnection of the water absorbing sheet 15 with the conductive paint applied to the outer surface of the end walls 31, 32, the projections $30_1$, $30_2$ which extend through the opposite ends of the water absorbing sheet 15 are applied with an electrically conductive adhesive, which serves providing an electrical interconnection between the conductive paint and the water absorbing sheet 15.

Figure 5:
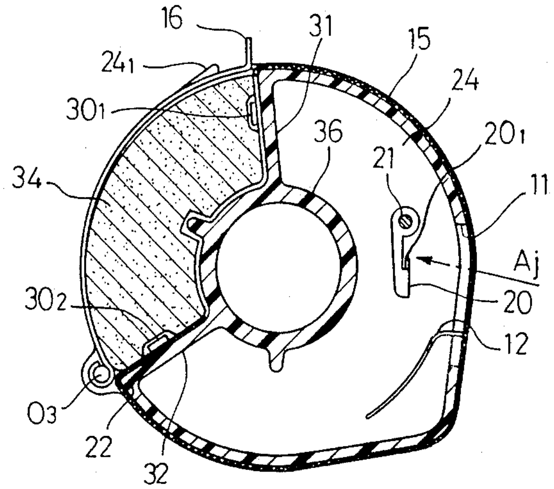
FIG. 5 is a cross section taken along the line V—V shown in FIG. 4.
Figure 6:
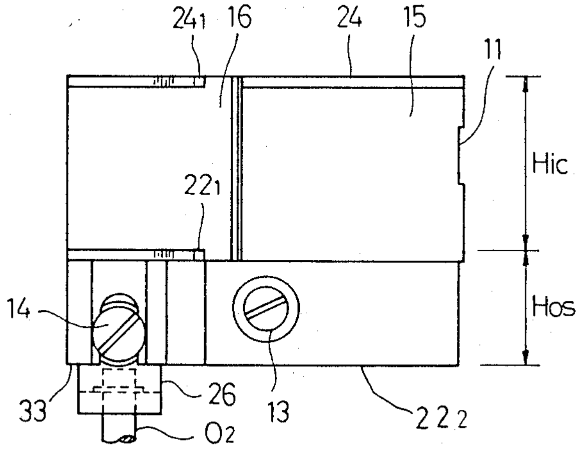
FIG. 6 is a plan view of the deflection adjusting apparatus shown in FIG. 3.

The sector-shaped space which extends from the end wall 31 counter-clockwise, as viewed in FIG. 5, to the end wall 32 houses a water absorbing pad 34 and is closed by a removable closure 16. The lower end of the closure 16 is pivotally mounted on a pin 03 while the upper end of the closure 16 is engaged with a claw $24_1$ which is integral with the closure plate 24 and also with a claw $22_1$ which is integral with the body 22. The pad 34 is simply pressed into the sector-shaped space. The closure 16 may be opened by rotating it counter-clockwise, as viewed in FIG. 3, or in a direction indicated by a both-ended arrow $AO_3$ about the pin $O_3$ after the upper end of the closure 16 is lifted upward to allow it to be disengaged from the pawls $24_1$, $24_2$. By removing the pad 34, a fresh pad may be loaded in place.

An isolating plate 12 is mounted in a manner to divide the opening 11 into upper and lower areas. As will be noted from FIG. 5, the isolating plate is folded intermediate its length, and is held in place by being inserted into grooves of corresponding configurations formed in both the partition 28 and the closure plate 24.

Charged ink particles which travel in the direction of the arrow Aj for purpose of detecting the deflection pass over the isolating plate 12 to enter the opening 11 and then impinge upon the upper edge $20_1$ of the detecting electrode 20 or pass over the edge $20_1$. In either instance, the ink particles collide with the electrode 20 or collide with the sleeve 36 or the end wall 31 to be deflected downward, flowing to the discard pipe 19. Ink particles may also be directed into the opening 11 along a direction of incidence which is slightly below the isolating plate 12 and higher than the lower end of the opening 11 in order to achieve a uniform ink viscosity, by dissipating stale ink and accelerating the supply of a fresh ink, either before or after the adjustment of the deflection. Such ink particles will impinge upon the isolating plate 12 at the bend thereof and then flow down the isolating plate 12 to reach the discard pipe 19. The ink which is contained in the discard pipe 19 is received in a discard ink vessle, not shown, to be discarded.

In use, when the deflection detecting apparatus is assembled into the ink jet printer as illustrated in FIG. 1, the locking screw 13 may be loosened to permit it to rotate about the platen shaft 2. When the adjusting screw 14 is tightened, the coiled spring 37 is compressed to rotate the detector unit 10 counter-clockwise, whereby the detecting electrode 20 is raised in elevation. If the adjusting screw 14 is loosened, the resilience of the coiled spring 37 enables the detector unit 10 to rotate clockwise, whereby the detecting electrode 20 is lowered in elevation. After the elevation of the electrode 20 is adjusted by means of the adjusting screw 14, the locking screw 13 may be tightened to secure the detector unit 10 to the support sleeve 3.

It will thus be seen that a relatively simple operation of loosening the locking screw 13, adjusting the elevation of the electrode 20 by means of the adjusting screw 14 and then tightening the locking screw enables the elevation of the detecting electrode to be adjusted and established. As is evident from FIG. 1, the deflection detecting apparatus is received between the platen 1 and the sideplate 4 in a compact manner, requiring a reduced space for its installation and without imposing any undue restrictions upon other mechanisms of the printer. A simple and compact support mechanism may be used for the detector unit 10. The adjustment of the elevation takes place in a facilitated manner since all that is required to effect such adjustment is to bring down a screwdriver.

The insulating coating on the pin 21 which supports the detecting electrode 20 at a portion thereof remote from the latter, in combination with the interposition of the partition 28 between the end of the pin 21 connected to the lead wire and the other end which carries the electrode, with the sleeve 29 separating the pin from the partition, and the positioning of the electrode 20 below the pin 21, allows any accumulation of ink on the electrode 20 to flow down the electrode to drip down rather than shifting toward the lead wire end along the pin 21. In this manner, any accumulation of ink on the electrode 20 is unlikely to flow down the pin 21 to its end connected to the lead wire or the nut $21_1$ to create a leak path between the electrode 20 and the ink deposited on the internal wall surface of the detector unit or a short-circuit to the ground. In particular, the lower location of the electrode 20 than the pin 21 eliminates any flow of ink along the pin 21, enhancing the prevention of a leak path or a short-circuit to the electrode 20.

In addition, the conductive paint is applied to the wall surfaces surrounding the electrode 20 to provide a shielding effect, except for the region immediately adjacent to the sleeve 29, and the conductive paint also extends through the opening to the external surface and is connected to the grounding wire 18 by means of the screw 25. Furthermore, the electrically conductive and water absorbing sheet 15 is wrapped around the external surface of the detector unit 10 and is connected to the grounding wire 18. These combine to provide an increased shielding effect against noise potentials, improving the precision of detecting the deflection or the occurrence or not of the impingement of the charged ink particles upon the electrode 20.

As mentioned initially, the detecting electrode 20 is connected to a charge detector circuit (integrator circuit) through the lead wire 17, and an integrated voltage of the circuit is compared against a reference value to determine the presence or absence of a charge in order to detect the deflection. For example, the presence of a charge is declared (or the impingement of the charged ink particles upon the electrode 20 is declared) if an integrated output is equal to or exceeds 2 volts. If the conductive paint is not applied, there may occur a potential rise of 1 volt if the charged ink particles do not impinge upon the electrode 20, giving rise to the possibility that a detection error may result. However, in the described embodiment, no increase in the integrated voltage is noted, thus drastically reducing the possibility that a detection error may occur.

Suction may be applied to the discard pipe 19 by means of a pump, whereby an ink spray which may be developed as a result of the impingement of the ink particles upon the electrode 20 or the chambers are withdrawn by the pump together with the air. However, the entire ink mist developed is not immediately drawn into the pipe 19, but is suspended across the opening 11, thus wetting the external surface of the detector unit 10. As the wetting by the ink proceeds, the ink may flow down the surface of the detector unit to cause a marring of the printer. However, such ink flow penetrates into the electrically conductive and water absorbing sheet 15, and when the amount of penetration increases, the ink flows down the sheet 15 to reach the pad 34 which absorbs it. Thus, the electrically conductive and water absorbing sheet 15 absorbs the ink mist, and when the absorption increases, the ink is transferred to the pad. In this manner, the ink which may be deposited on the external surface of the detector unit 10 is recovered by the pad 34. It is a simple matter to change the pad 34 with a fresh one by opening the closure 16 periodically or as required. Thus the combination of the electrically conductive and water absorbing sheet 15 and the water absorbing pad 34 prevents any marring which may result from the ink dripping from the external surface of the detector unit 10.

During the standby mode and during the time when the deflection is being detected, a carriage having a record head mounted thereon is placed at its home position. At this time, an ink injection nozzle of the record head is located opposite to the opening 11 of the detector unit 10. For purpose of detection, ink particles are charged according to a given charge code and then subject to a given deflection field to fly into the opening 11 as indicated by the arrow Aj. When the deflection is to be detected by adjusting the magnitude of the deflection from a low value, the gain of a charge voltage amplifier, an ink pressure, an ink temperature and/or the viscosity of an ink are gradually changed from values which provide a low deflection to different values which provide a higher deflection. In a corresponding manner, the point of impingement of the charged ink particles upon the electrode 20 goes high. When the charged ink particles initially impinge upon the electrode 20, which then detects the charge, and subsequently when the impingement is no longer detected, it is determined that a proper deflection for the charged ink particles is established, thus completing the adjustment of the deflection.

Conversely, when the deflection is detected by adjusting from a high deflection, the gain of a charge voltage amplifier, an ink pressure, an ink temperature and/or the viscosity of an ink are gradually changed from values which provide a high deflection to different values which provide a lower deflection, and the path of flight of the charged ink particle then moves close to the upper end of the electrode 20. When the charged ink particles have not been initially impinging upon the electrode 20, which then does not detect the charge, but subsequently begin to impinge upon the electrode, it is determined that a proper deflection for the charged ink particles is established, thus completing the adjustment of the deflection. During such adjustment, it will be noted that the charged ink particles move over the isolating plate 12.

When controlling the viscosity of the ink, stale ink is exhausted by injecting it in a rapid manner. At this time, the ink recovered by the detector unit 10 is fed through the pipe 19 to be recovered by the discard ink vessel, the content of which is discarded periodically or as required and is not returned to the circulating system. Since the amount of ink which is supplied to the detector unit 10 for purpose of adjusting the deflection is small, an ink is injected into the detector unit 10 for a given time interval and with a low deflection either before or after the adjsutment of the deflection. Such ink is to be discarded. At this time, the ink particles enter the opening 11 in the area located below the isolating plate 12 and flows down the isolating plate 12 in a region which is smoothly bent, producing a little quantity of ink spray. If the isolating plate 12 were not provided, the ink particles will collide with the sleeve 36 to produce an ink spray or mist which will also cover the electrode 20. However, the presence of the isolating plate 12 reduces the amount of an ink spray or mist generated, and such spray or mist is intercepted by the isolating plate 12, and thus is prevented from marring the electrode 20 to any significant degree.

What is claimed is:

1. An apparatus for detecting deflection of charged ink particles comprising:

a detector unit for detecting charged ink particles, the unit including a substantially cylindrical housing having a front surface and an opening formed in its front surface for receiving flying ink particles, an electrode disposed internally of said housing for detecting charged ink particles, a spring abutment located at the rear side of said housing and means defining a central sleeve extending across said opening and a central bore extending through said central sleeve;

a stationary sleeve member extending through said bore and a bore in said stationary sleeve member for permitting a platen shaft member to extend therethrough;

spring means for urging the detector unit for rotation in one direction about the axis of the central bore;

an adjusting screw member disposed for engagement with the spring abutment and a stationary member for preventing a rotation of the detector unit under the resilience of the spring means beyond a set position;

a threaded hole extending from the surface of the housing to the central bore; and a locking screw member threadably engaging the threaded hole and adapted to be tightened against the sleeve member.

2. An apparatus for detecting deflection of charged ink particles comprising:

a hollow housing having an opening which receives flying ink particles;

an electrically conductive electrode support secured to and in a space in the housing;

a charge detecting electrode suspended from the electrode support in a manner such that an upper edge of the electrode is located below an end of the electrode support which carries the electrode, the detecting electrode being positioned for impingement thereon of ink particles which enter the interior of the housing through the opening and follow a given path of flight;

an electrically conductive layer disposed on the surface of the housing which surrounds the space in which the detecting electrode is positioned and wherein said electrically conductive layer is electrically connected to a grounding wire;

a separate space defined within the housing for housing a water absorbing member and being open to the exterior of the housing, said separate space being separate from the space in which the detecting electrode is received;

an absorbing member received within the separate space;

a water absorbing sheet attached to the external surface of the housing around the opening and extending into the separate space which houses the water absorbing member;

a removable closure which closes the separate space which houses the water absorbing member; and a unit support means for supporting the housing.

3. An apparatus according to claim 2 in which the electrode support is insulatingly coated except for a portion thereof which is used for electrical interconnection.

4. An apparatus according to claim 2 in which the housing includes a partition formed of insulating material and having a central opening through which a length of the electrode support extends with said partition being between said portion of the electrode support used for electrical interconnection and the end which carries the detecting electrode extends.

5. An apparatus according to claim 2 in which the water absorbing sheet is electrically conductive and is connected to said grounding wire.

6. An apparatus according to claim 2 further including an isolating plate which divides the opening into an upper area and a lower area, thus preventing any ink which has found its way into the lower area from being dispersed into the upper area.

7. An apparatus according to claim 6 in which the isolating plate is disposed at an angle with respect to a line of incidence of ink particles which move into the lower area and includes an angled portion which directs the ink particles in a downward direction.

8. An apparatus according to claim 2 in which the housing also includes a screw abutment disposed at the rear side thereof for engagement wtih an adjusting screw, and a bore defined across the opening and the screw abutment for allowing a shaft member to pass therethrough, and in which the unit support means additionally includes shaft member which extends through the bore, spring means for urging the housing for rotation in one direction about the shaft member, and an adjusting screw member disposed for engagement with the screw abutment and a stationary piece for preventing a rotation of the housing under the resilience of the spring means.

9. An apparatus according to claim 8 in which the shaft member comprises a support member through which a platen shaft extends.

10. An apparatus according to claim 9 in which the unit support means additionally includes a threaded hole which extends from the upper surface of the housing to the bore, and a locking screw member threadably engaging the threaded hole and adapted to be tightened against the support member.

* * * * *